United States Patent
Isaev

(10) Patent No.: US 10,414,689 B2
(45) Date of Patent: Sep. 17, 2019

(54) CHEMICAL COMPOSITION FOR PRODUCTION OF HOLLOW SPHERICAL GLASS PARTICLES WITH HIGH COMPRESSIVE STRENGTH

(71) Applicant: Omya International AG, Oftringen (CH)

(72) Inventor: Alexander Isaev, Vienna (AT)

(73) Assignee: Omya International AG, Oftringen (CH)

(*) Notice: Subject to any disclaimer, the term of this patent is extended or adjusted under 35 U.S.C. 154(b) by 140 days.

(21) Appl. No.: 15/345,319

(22) Filed: Nov. 7, 2016

(65) Prior Publication Data
US 2017/0174561 A1  Jun. 22, 2017

(30) Foreign Application Priority Data

Dec. 21, 2015  (EP) .................................... 15201520

(51) Int. Cl.
*B22D 25/00* (2006.01)
*C03C 11/00* (2006.01)
*C03C 3/083* (2006.01)
*C03C 3/085* (2006.01)

(52) U.S. Cl.
CPC .......... *C03C 11/002* (2013.01); *B22D 25/005* (2013.01); *C03C 3/083* (2013.01); *C03C 3/085* (2013.01)

(58) Field of Classification Search
None
See application file for complete search history.

(56) References Cited

U.S. PATENT DOCUMENTS

| | | | |
|---|---|---|---|
| 7,666,505 B2 | 2/2010 | Thompson et al. | |
| 8,815,408 B1 | 8/2014 | Strbik et al. | |
| 9,096,034 B2 | 8/2015 | Sherman et al. | |
| 2001/0043996 A1* | 11/2001 | Yamada | C03B 19/107 428/34.4 |
| 2004/0079260 A1* | 4/2004 | Datta | C03C 11/002 106/815 |
| 2004/0081827 A1 | 4/2004 | Thompson et al. | |

(Continued)

FOREIGN PATENT DOCUMENTS

| | | |
|---|---|---|
| EP | 1156021 A1 | 11/2001 |
| WO | 9116273 A1 | 10/1991 |

OTHER PUBLICATIONS

Extended European Search Report for European Application No. 15201520, Search completed May 13, 2016, 2 Pgs.

(Continued)

*Primary Examiner* — Scott R. Walshon
*Assistant Examiner* — Elaine M Vazquez
(74) *Attorney, Agent, or Firm* — KPPB LLP

(57) ABSTRACT

A hollow spherical glass particle, comprising aluminum oxide $Al_2O_3$, silicon dioxide $SiO_2$ and at least one metal oxide, wherein the metal oxide is selected from the group consisting of alkali metal oxides and alkaline earth metal oxides, wherein the ratio of aluminum atoms to alkali metal atoms is about 1:1 and the ratio of aluminum atoms to earth alkali atoms is about 2:1, with the proviso that the hollow spherical glass particle is free of boron.

11 Claims, 1 Drawing Sheet

(56) References Cited

U.S. PATENT DOCUMENTS

| | | | |
|---|---|---|---|
| 2005/0250639 A1* | 11/2005 | Siebers | C03C 3/083 501/68 |
| 2010/0160527 A1 | 6/2010 | Meshey et al. | |
| 2011/0152056 A1 | 6/2011 | Qi | |
| 2013/0098203 A1* | 4/2013 | Sherman | B32B 5/18 75/230 |
| 2015/0315075 A1 | 11/2015 | Pham et al. | |

OTHER PUBLICATIONS

Budov, V. V., "Hollow glass microspheres. Use, properties, and technology (Review)", Science in Glass Production, Glass and Ceramics, Jul. 1994, vol. 51, Issue 7, pp. 230-235.

* cited by examiner

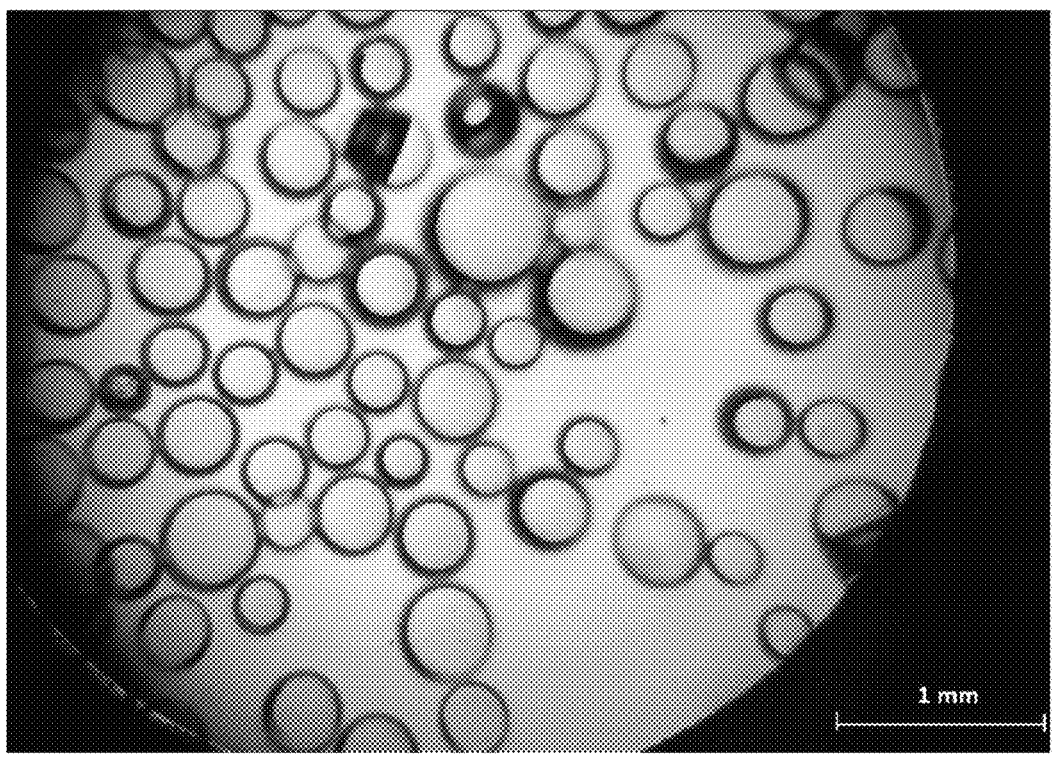

CHEMICAL COMPOSITION FOR PRODUCTION OF HOLLOW SPHERICAL GLASS PARTICLES WITH HIGH COMPRESSIVE STRENGTH

CROSS REFERENCE TO RELATED APPLICATIONS

This application claims priority to European Patent Application No. 15201520.2, entitled "Chemical Composition for Production of Hollow Spherical Glass Particles with High Compressive Strength" to Isaev, filed Dec. 21, 2015, the disclosures of which are incorporated by reference herein in their entirety.

FIELD OF THE INVENTION

The invention concerns a hollow spherical glass particle.

Moreover, the invention concerns a plurality of hollow spherical glass particles.

Furthermore, the invention concerns a filler comprising a plurality of hollow spherical glass particles.

Furthermore, the invention concerns the use of a filler according to the invention in metal matrix syntactic foams.

Moreover, the invention concerns a metal matrix syntactic foam comprising a filler according to the invention.

BACKGROUND

Hollow spherical glass particles, also known in the state of the art as "synthetic glass microspheres" or "glass microbubbles" or "glass microballoons", typically have low specific gravity, satisfactory heat resistance, heat insulating properties, pressure-resistance (e.g., crush strength) and impact resistance, and may achieve superior physical properties in comparison to conventional fillers. Each hollow spherical glass particle has an essentially spherical form and an essentially spherical inner void.

Due to their advantageous properties the hollow spherical glass microspheres are used in a variety of areas and applications. For example, the hollow spherical glass microspheres are used as light-weight fillers for composite polymeric materials of different kinds or in cryogenic technology, for fabrication of acoustic and thermal insulating materials or as targets for laser thermonuclear synthesis. An overview of the state of the art regarding the use, properties and technology of the hollow spherical glass particles can be found for example in "*Hollow glass microspheres. Use, properties, and technology (Review)*" by V. V. Budov in Science In Glass Production, Glass and Ceramics, July 1994, Volume 51, Issue 7, pp 230-235.

Several methods for producing hollow spherical glass particles have also been developed and are described in the prior art. Early methods for manufacturing hollow glass microspheres involved for example combining sodium silicate and boric acid with a suitable foaming agent, drying (for example in a spray dryer) or crushing the mixture with addition ingredients (for example in a ball mill with a suspension of water, china clay, feldspars, metakaolin, sodium silicate and/or potassium silicate, zeolites, sodium carbonate and/or potassium carbonate and/or calcium carbonate and/or magnesium carbonate, aluminium hydroxide etc.), adjusting the size of the crushed particles and drying the mixture in a spray dryer in order to achieve granules. Subsequently the granules are fired. The firing temperature achieves values of between about 1200° C. and 1800° C. However, these methods have a drawback that starting materials such as boric acid are required that can result in the formation of toxic compounds during production of and/or while using the hollow spherical glass particles.

U.S. Pat. No. 7,666,505 B2 describes hollow spherical glass particles comprising aluminosilicate and methods of making same. The hollow spherical glass microspheres described therein comprise 5.2 wt. % to 30 wt. % calcium oxide and greater than 4 wt. % to less than about 10 wt. % sodium oxide, wherein the microspheres have a total alkali metal oxide content of less than about 10 wt. %. In addition, U.S. Pat. No. 7,666,505 B2 describes that the presence of relatively high percentage of sodium oxide results in a poor chemical durability of the hollow spherical glass particles.

U.S. patent application Ser. No. 09/858,571 (Pub. No: US 2001/0043996 A1) and U.S. patent application Ser. No. 14/440,249 (Pub. No: US 2015/0315075 A1) describe hollow glass aluminosilicate microspheres and processes for their production. The mechanical durability of these microspheres is higher due to boron trioxide ($B_2O_3$). However, as described above, the presence of boron that may lead to toxic boron compounds is undesirable. Moreover, the presence of boron trioxide lowers the melting temperature of the microspheres.

SUMMARY OF THE INVENTION

Many embodiment are directed to a hollow spherical glass particle, including: aluminum oxide Al2O3, silicon dioxide SiO2 and at least one metal oxide, wherein the metal oxide is selected from the group consisting of alkali metal oxides and alkaline earth metal oxides;

wherein the ratio of aluminum atoms to alkali metal atoms is about 1:1 and the ratio of aluminum atoms to earth alkali atoms is about 2:1; with the proviso that the hollow spherical glass particle is free of boron.

In many other embodiments, the hollow spherical glass particle comprises between about 32 wt. % and about 40 wt. %, preferably about 36 wt. %, of Al2O3, between about 38 wt. % and about 46 wt. %, preferably about 42 wt. %, of SiO2, and between about 18 wt. % and about 26 wt. %, preferably about 22 wt. %, of at least one alkali metal oxide.

In still many other embodiments, the hollow spherical glass particle comprises between about preferably 18 wt. %, and about 26 wt. %, preferably about 22 wt. %, of a mixture of K2O and Na2O.

In yet many other embodiments, the hollow spherical glass particle has a particle diameter of between about 10 and 600 microns, preferably between about 90 and 500 microns.

In still yet many other embodiments, the hollow spherical glass particle has a particle diameter of between 100 and 400 microns.

In yet still many other embodiments, the hollow spherical glass particle has an 80% crush strength of at least 10000 psi, more preferably at least 12500 psi, especially at least 15000 psi.

In still yet many other embodiments, the hollow spherical glass particle has melting temperature of at least 1200° C.

Various embodiments are directed to a pluarlity of hollow spherical glass particles.

In various other embodiments, the hollow spherical glass particles have a true density of between about 0.4 g/cm3 and 0.8 g/cm3, more peferably between about 0.45 g/cm3 and 0.75 g/cm3, more preferably between about 0.5 g/cm3 and 0.6 g/cm 3.

Many other embodiments are directed to a filler including the plurality of hollow spherical glass particles.

Various other embodiments are directed to the use of the filler in metal matrix syntactic foams.

Many other embodiments are directed to a metal matrix syntactic foam comprising the filler and a metal and/or a metal alloy.

In many other embodiments, the metal is aluminum.

In still many other embodiments, the metal alloy is an aluminum alloy.

DESCRIPTION OF THE FIGURES

FIG. 1 shows a microscopic image of the hollow spherical glass particles of the above example, in which the granules were not separated according to their size. Therefore, all three types (Type 1, Type 2 and Type 3) of the hollow spherical glass particles are depicted in FIG. 1.

The minimal size (diameter) of the hollow spherical glass particles in FIG. 1 is about 100 microns, the maximal size (diameter) is about 400 microns.

DETAILED DESCRIPTION

The objective of the present invention is to provide a boron-free chemical composition for production of hollow spherical glass particles and materials comprising such particles with high mechanical durability and high melting temperature.

According to the invention, this objective is achieved by providing hollow spherical glass particles comprising aluminum oxide ($Al_2O_3$), silicon dioxide ($SiO_2$) and at least one metal oxide, wherein the metal oxide is selected from the group consisting of alkali metal oxides and alkaline earth metal oxides, wherein the ratio of aluminum atoms to alkali metal atoms is about 1:1 and the ratio of aluminum atoms to earth alkali atoms is about 2:1, with the proviso that the hollow spherical glass particle is free of boron.

Advantageously, the hollow spherical glass particle comprises sodium oxide. It is generally understood from the state of the art that adding sodium oxide reduces the chemical stability of the hollow spherical glass particle. However, according to the present invention, the presence of sodium oxide and in generally alkali metal oxides, such as potassium oxide, or alkaline earth metal oxides (such as CaO and/or MgO) in a right proportion can surprisingly increase the mechanical robustness (80% crush strength) of the hollow spherical glass particle. In the state of the art, the mechanical stability (80% crush strength) of the hollow spherical glass particle is usually provided by adding some boron compounds. According to the present invention, however, no addition of such, potentially toxic, compounds is needed.

In one preferred embodiment of the invention, the hollow spherical glass particle comprises between about 32 wt. % and about 40 wt. %, preferably about 36 wt. %, of $Al_2O_3$, between about 38 wt. % and about 46 wt. %, preferably about 42 wt. %, of $SiO_2$ and between about 18 wt. % and about 26 wt. %, preferably about 22 wt. %, of at least one alkali metal oxide.

In another preferred embodiment of the invention, the hollow spherical glass particle comprises between about preferably 18 wt. % and about 26 wt. %, preferably about 22 wt. %, of a mixture of $K_2O$ and $Na_2O$. The wt. % ratio between the potassium and sodium oxides can be chosen arbitrarily. Instead of or in addition to the potassium oxide a lithium oxide $Li_2O$ can be chosen as well. Without being wished to be bound to a certain theory, it is understood that due to mixing of at least two alkali metal oxides (for example of $K_2O$ and $Na_2O$) a so-called mixed-alkali effect is achieved, which for example makes the hollow spherical glass particles chemically more stable.

In other embodiments, the hollow spherical glass particle has a particle diameter of between about 10 and about 600 microns, preferably of between about 90 and about 500 microns.

Furthermore it can be provided that the hollow spherical glass particle has a particle diameter of between about 100 and about 400 microns.

As it will be demonstrated by the examples provided below, differently sized particles can have different 80% crush strength. Generally and especially within the scope of the present invention it is understood that "80% crush strength" refers to a pressure at which essentially about 20% of particles are destroyed, i.e. loose their essentially spherical form.

In one preferred embodiment it can be provided that the hollow spherical glass particle has an 80% crush strength of at least 10000 psi, more preferably at least 12500 psi, especially at least 15000 psi. The particles in this invention were subjected to an isostatic compressive strength test in a crush strength measuring apparatus (POREMASTER 60 GT by Quantachrome Istruments). It is important to note that no hardening (chemical hardening, temperature hardening or other type of hardening) of the hollow spherical glass particles according to the invention was performed prior to the above mentioned isostatic compressive test. Typically, a silane coating is added to the conventional hollow spherical glass particles prior to the isostatic compressive strength test, in order to increase their 80% crush strength. No such hardening was performed with the hollow spherical glass particles according to the invention.

Moreover, in other embodiments, the hollow spherical glass particle has melting temperature of at least 1200° C.

According to the invention, the object is also achieved by means of a plurality of hollow spherical glass particles as described herein. In preferred embodiments, the plurality of the hollow spherical glass particles have a true density, i.e. the density of the particles that make up a powder or particulate solid, of between about 0.4 g/cm³ and about 0.8 g/cm³, more preferably of between about 0.45 g/cm³ and about 0.75 g/cm³, more preferably a true density of between about 0.5 g/cm³ and about 0.6 g/cm³.

According to the invention the object is also achieved by means of a metal matrix syntactic foam comprising a filler, wherein the filler comprises a plurality of the hollow spherical glass particles according to the invention, wherein the metal in the metal matrix syntactic foam is aluminum alloy or aluminum.

Metal matrix syntactic foams, also known as "syntactic metal materials" (see e.g. U.S. Pat. No. 9,096,034 B2) or "metal syntactic foams" (see e.g. U.S. Pat. No. 8,815,408 B1), are known to the person skilled in the art mostly due to their exceptionally high strength. There are different materials known in the art that can be used as fillers in such foams. U.S. Pat. No. 9,096,034 B2 describes ceramic microballoons as a filler. In U.S. Pat. No. 8,815,408 B1 hollow metallic shells are used for filling purposes.

Thus, according to the present invention an aluminum metal matrix syntactic foam is provided by mixing melted aluminum or aluminium alloy having its melting temperature of between about 600° C. and about 700° C., and a plurality of hollow spherical glass particles according to the invention and described herein. In contrast to the hollow spherical glass particles according to the invention, conventional hollow spherical glass particles have either a relatively high crush strength and a low melting temperature or relatively low crush strength and a high melting temperature.

The invention is further explained by the following non-limiting example describing a method for producing hollow spherical glass particles according to the invention.

EXAMPLE

Three samples were prepared by mixing ingredients containing aluminium oxide $Al_2O_3$, sodium oxide $Na_2O$, silicon dioxide $SiO_2$ and potassium oxide $K_2O$ (for example the resulting mixture can comprise china clay, feldspar, potassium carbonate, zeolites, aluminium hydroxide, potassium or sodium silicate, porcelain) in order to achieve an atomic ratio of aluminum, silicon and either sodium or potassium or both sodium and potassium atoms of about 1:1:1, i.e. $A_{Al:Si:(Na+K)}=1:1:1$. This means that for each Al atom there is essentially one Si atom and essentially one Na or K atom in the mixture. For two Al atoms there are essentially two Si atoms and either essentially one Na atom and essentially one K atom or essentially two Na atoms or essentially two K atoms. In particular, in this example the mixture comprised about 36 wt. % of $Al_2O_3$, about 42 wt. % of $SiO_2$, about 21 wt. % of $Na_2O$ and about 1% of $K_2O$. Depending on the purity of these ingredients there might be may be impurities, i.e. other chemical compounds, present. However, the total amount of impurities (other chemical compounds) should not exceed 3-4 wt. %.

After mixing the ingredients above, the mixture can be milled in a ball mill, in order to achieve an average size of particles of at most about 5 microns. The milling can be dry or wet and can be omitted if the particle size does not have to be adjusted. Thereafter the mixture was further mixed with water and blended, in order to achieve enough flowability for subsequent spray drying. After drying in a spray dryer at the temperature of about 150-250° C., a powder with granules (particles) having an with average size of about 80-400 microns was achieved. The granules was then separated according to their size into three fractions: Fraction 1: about 80-140 microns; Fraction 2: about 140-200 microns; and Fraction 3: about 200-400 microns; all fractions having a moisture content of at least about 1% and at most 10%. After the separation step, each fraction was fed into a tube furnace with induction heating at a rate of about 1 grams/min. A graphite tube was used as a heating element and argon was used as a protective gas for providing a protected atmosphere in the furnace. The temperature in the furnace was between about 1500° and about 1800° C. Residence time of the particles in the furnace was at least 1 sec. After processing the respective granules fractions 1, 2 and 3 in the tube furnace, the resulting hollow spherical glass particles were collected 50 cm below the furnace.

As a result, three types of the hollow spherical glass particles were obtained. Their properties are summarized below.

Type 1 (resulting from Fraction 1): The hollow spherical glass particles of the first type have an essentially white color and exhibit a bulk density of about 0.43 g/cm³, a true density of about 0.75 g/cm³, a particle diameter of between about 100 micron and about 150 micron, a melting temperature of about 1200° C. and an 80% crush strength of about 15000 psi (100 Mpa).

Type 2 (resulting from Fraction 2): The hollow spherical glass particles of the second type have an essentially white color and exhibit a bulk density of about 0.38 g/cm³, a true density of about 0.6 g/cm³, a particle diameter of between about 150 micron and about 200 micron, a melting temperature of about 1200° C. and an 80% crush strength of about 12500 psi (85 Mpa).

Type 3 (resulting from Fraction 3): The hollow spherical glass particles of the third type have an essentially white color and exhibit a bulk density of about 0.32 g/cm³, a true density of about 0.5 g/cm³, a particle diameter of between about 200 micron and about 400 micron, a melting temperature of about 1200° C. and an 80% crush strength of about 10000 psi (70 Mpa).

Generally and especially within the scope of the present invention it is understood that the bulk density is not an intrinsic property of the hollow spherical glass particles and can essentially slightly change depending on how the particles are handled. Within the scope of this invention the hollow spherical glass particles have a bulk density of between about 0.3 g/cm³ and about 0.45 g/cm³.

What is claimed is:

1. A hollow spherical glass particle, comprising:
   between about 32 wt. % and about 40 wt. % aluminum oxide $Al_2O_3$, between about 38 wt. % and about 46 wt. % silicon dioxide $SiO_2$ and at least one metal oxide, wherein the metal oxide comprises at least between about 18 wt. % and about 26 wt. % of at least one alkali metal oxide, and optionally alkaline earth metal oxides;
   wherein the ratio of aluminum atoms to alkali metal atoms is about 1:1;
   wherein where alkaline earth metal oxides are present the ratio of aluminum atoms to alkaline earth metal atoms is about 2:1;
   wherein the hollow spherical glass particle has a particle diameter of between 100 and 400 microns; and
   with the proviso that the hollow spherical glass particle is free of boron.

2. The hollow spherical glass particle of claim 1, wherein the at least one alkali metal oxide comprises a mixture of $K_2O$ and $Na_2O$.

3. The hollow spherical glass particle of claim 1, wherein the hollow spherical glass particle has an 80% crush strength of at least 10000 psi.

4. The hollow spherical glass particle of claim 1, wherein the hollow spherical glass particle has a melting temperature of at least 1200° C.

5. A plurality of hollow spherical glass particles of claim 1.

6. The plurality of hollow spherical glass particles of claim 5, wherein the hollow spherical glass particles have a true density of between about 0.4 g/cm³ and 0.8 g/cm³.

7. A filler comprising the plurality of hollow spherical glass particles of claim 1.

8. A method of using the filler of claim 7 in metal matrix syntactic foams.

9. A metal matrix syntactic foam comprising the filler of claim 7 and a metal and/or a metal alloy.

10. The metal matrix syntactic foam of claim 9, wherein the metal is aluminum.

11. The metal matrix syntactic foam of claim 9, wherein the metal alloy is an aluminum alloy.

* * * * *